United States Patent Office 3,493,618
Patented Feb. 3, 1970

3,493,618
PROCESS FOR THE SEPARATION OF KETONES
Robert Fuhrmann, Morris Plains, N.J., assignor to Allied Chemical Corporation, New York, N.Y., a corporation of New York
No Drawing. Filed Oct. 20, 1965, Ser. No. 499,007
Int. Cl. C07c 45/24, 49/04
U.S. Cl. 260—586   8 Claims

ABSTRACT OF THE DISCLOSURE

Linear $C_3$ to $C_{20}$ aliphatic ketones can be separated from mixtures thereof with $C_3$ to $C_{16}$ non-linear ketones by sorption of the former onto metallo-alumino silicate molecular sieves.

---

This invention relates to a process for separating ketones. More particularly, it relates to a process for separating linear aliphatic ketones from a mixture of the same with branched chain aliphatic and/or cyclic ketones.

Ketones derived from the oxidation of hydrocarbons may comprise mixtures which includes linear and branched chain aliphatic ketones, cyclic ketones and aromatic ketones, in various proportions, depending upon the make-up of the feed stock mixture. Where the feed stock mixture contains organic compounds of similar molecular weight, separation of the oxidation products thereof based upon differences in the molecular structure becomes very difficult. Separation of the constituents of narrow boiling range mixtures by conventional processes such as fractional distillation is expensive and often products of high purity are not obtainable.

While the prior art discloses methods of separating hydrocarbons as well as other organic compounds by employing solid sorbents, known as molecular sieves, it had not been suggested that ketones could be separated by the use of such molecular sieves. Indeed it was thought that ketones such acetone or methyl ethyl ketone "poisoned" sorption systems employing molecular sieves thereby preventing the separation of mixtures containing ketones, hydrocarbons and other organic compounds.

It has now been found that certain solid sorbents, known as molecular sieves, to wit, metallo-alumino silicates, have the capacity of selectively sorbing linear aliphatic ketones in preference to branched chain or cyclic ketones. The separation of linear aliphatic ketones from a ketone mixture containing the same is attained by a process which comprises contacting the mixture, in the liquid or vapor phase, with an activated (i.e. dehydrated) metallo-alumino silicate, separating the effluent which contains the non-sorbed ketones and inert organic solvent, if present, and recovering the sorbed linear aliphatic ketone from the metallo-alumino silicate. The regenerated solid sorbent, free of sorbed component is then in condition for reuse in the sorption stage of the process.

The process of this invention is applicable to binary and multicomponent mixtures containing at least one member of Group A which comprises linear aliphatic ketones having 3 to 20 carbon atoms, and fluorine substituted linear aliphatic ketones of similar chain length, and at least one member of Group B which comprises non-linear ketones, having 3 to 16 carbon atoms which non-linear ketones can be substituted with radicals of low polarity such as alkyl, fluoride, chloride, nitrile, nitro, and alkoxy, which are stable under the conditions of temperature and pressure employed. In addition, said multicomponent mixtures can includes an inert organic solvent which is not capable of being sorbed by the metallo-alumino silicate.

The proportions of ketones which can be separated by the process of this invention are not limited and may vary widely from between about 1% and 99% by weight of Group A to between about 99% and 1% by weight of Group B.

The solid sorbents employable in the process of this invention are preferably crystalline partially dehydrated metallo-alumino silicates, also known as zeolites. A zeolite has been defined as an alumino-silicate with a framework structure enclosing cavities occupied by large ions and water molecules, both of which have considerable freedom of movement, permitting ion exchange and reversible dehydration. When zeolites are heated (i.e. activated) to dehydrate the molecules they develop great sorptive capacities for molecules small enough to pass through the pores (or "windows") of the crystalline cavities. In addition, when freed of their intracrystalline water, zeolites are remarkably stable to heating, and can withstand temperatures of up to 500° C. almost indefinitely, and even higher temperatures for considerable periods. For the sorption of linear aliphatic ketones a suitable pore diameter will range from a minimum of about 4.8 angstrom units up to a maximum of about 0.5 to 1 angstrom unit less than the diameter of the smallest branched chain or cyclic ketone to be excluded. One type of commercially available synthetic molecular sieve sorbent has a composition corresponding to a calcium alumino-silicate (dehydrated $Ca_6(AlO_2)_{12} \cdot 27H_2O$) and comprises particles having pores of approximately 5 angstrom units diameter. Certain naturally occurring minerals such as calcium-rich chabazite, barium zeolite and gmelinite have about the same pore diameter and are also useful.

The size of the pores in these molecular sieves are such that when a solid sorbent of the type desired preferably in the crystalline form, is contacted with a mixture of the ketones to be separated, comprising at least one ketone of linear aliphatic structure and at least one other ketone of branched chain or cyclic structure, only those ketones present in the feed stock mixture which have a linear configuration will be sorbed within the internal structure of the solid particles of sorbent. The diameter of the pores will not be large enough to permit the sorption to the internal structure of those components having a branched chain or cyclic structure, and hence these components will be rejected, i.e. they will pass through, the solid particles of sorbent.

There are several ways in which the separation process of this invention can be carried out. The solid sorbent can be employed in the form of a dense compact fixed or moving bed or fluidized bed, which is alternately contacted with the feed stock and then desorbed. In the simplest method, the sorbent is employed in the form of a single static bed, in which case the process is only semi-continuous. Preferably, in carrying out this invention, a set of two or more static beds communicating with appropriate valving is employed so that the feed stream is passed through one or more sorbent beds, while the desorption is carried out in one or more other beds in the set. A continuous process for separating normal aliphatic hydrocarbons from hydrocarbon mixtures employing a fluidized bed is described in U.S. Patent 2,957,927, Oct. 25, 1960 to Broughton et al. The process described therein comprises contacting a hydrocarbon feed mixture with a molecular sieve sorbent which has been suspended in an organic amine, said amine being substantially but not completely immiscible with the feed mixture, and thereafter withdrawing a raffinate stream comprising the excluded hydrocarbons from a liquid slurry comprising the sorbent containing sorbed normal aliphatic hydrocarbons suspended in the organic amine.

In the carrying out of the process of this invention the direction of flow of the feed stock during sorption and desorption can be either up or down through the sorbent, but preferably the sorption is effected in one flow direction and desorption in the other.

The rate of sorption is dependent upon the temperature conditions prevailing during the process as well as the molecular weight of the molecules being sorbed and the diameter of the sorbent pores. Generally, the rate of sorption increases with temperature, and a temperature range of from about 20° C. to about 250° C. can be used in the practice of this invention. Preferably the range is from about at least 50° C. to about 180° C. The pressure is usually atmospheric, but it can be subatmospheric or superatmospheric.

After the feed stock mixture has been passed through the solid sorbent two phases will be present, the unsorbed phase containing unsorbed ketones in the solvent, if present, and the sorbed phase comprising the solid sorbent rich in the desired linear aliphatic ketones of the feed mixture. Desorption of the solid phase thereafter follows and the linear aliphatic ketones are thereby recovered. Desorption can be by any of the known methods such as by the application of heat, pressure surge, vacuum, flushing with an excess of inert gas or a liquid with a boiling point higher or lower than that of the sorbed ketones, or any combination of these methods.

This invention will be described further in conjunction with the following specific examples, but it is to be understood that these are merely illustrative and are not designed to limit the invention thereto. The sorbent used in the examples was activated by heating at 250° C. for two hours under nitrogen.

EXAMPLE 1

A mixture containing 0.5535 gram of methyl ethyl ketone, 0.5757 gram of cyclopentanone, and 19.119 grams of cyclohexane was charged to a 150-ml. flask fitted with a reflux condenser provided with a nitrogen by-pass to insure a dry, inert atmosphere and containing 11.038 grams of activated Linde sieve 5A. The flask was maintained at reflux temperature (81.5° C.) for 24 hours and cooled. The cyclohexane solution was analyzed by vapor phase chromatography. No methyl ethyl ketone was present indicating complete separation of the linear from the cyclic ketone.

EXAMPLE 2

A mixture of 0.5092 gram of methyl ethyl ketone and 20.3792 grams of cyclopentanone was contacted with 11.0295 grams of activated Linde sieve 5A for 24 hours at 81.5° C. in a flask as in Example 1. The cooled unadsorbed liquid was analyzed by vapor phase chromatography; only 0.19% by weight of methyl ethyl ketone was found, indicating that 92.2% of the linear ketone was sorbed by the molecular sieve under these conditions.

EXAMPLE 3

A mixture of 0.506 gram methyl ethyl ketone (2-butanone), 0.507 gram 3-methyl-2-butanone and 20.010 grams cyclohexane was contacted with 10.469 grams of activated Linde sieve 5A for 24 hours at 80.5° C. in a flask as in Example 1. The cooled effluent was analyzed by vapor phase chromatography; no methyl ethyl ketone was detected therein.

EXAMPLE 4

A mixture of 0.553 gram methyl ethyl ketone and 18.867 grams 3-methyl-2-butanone was added to a 3 ounce pressure bottle containing 9.509 grams of activated Linde sieve 5A. The bottle was purged with nitrogen, closed and immersed in an oil bath at 81° C. for 24 hours. 78% by weight of the linear ketone was adsorbed, as determined by vapor phase chromatographic analysis of the non-sorbed mixture.

EXAMPLE 5

A mixture containing 0.515 gram 2-octanone, 0.508 gram cyclooctanone and 20.053 grams cyclohexane was contacted with 10.365 grams activated Linde sieve 5A at 80.5° C. for 24 hours in a flask as in Example 1. 67% of the linear ketone was adsorbed, as determined by vapor phase chromatographic analysis of the non-sorbed mixture.

EXAMPLE 6

0.523 gram 2-undecanone and 20.007 grams 3-methyl-2-butanone were charged to a flask as in Example 1 containing 10.073 grams activated Linde sieve 5A and heated for 24 hours at 81° C. 53% of the linear ketone was adsorbed as determined by vapor phase chromatographic analysis of the non-sorbed mixture.

I claim:
1. A process for separating linear aliphatic ketones and fluorine substituted linear aliphatic ketones having from 3 to 20 carbon atoms from a mixture thereof with non-linear ketones having from 3 to 16 carbon atoms, which comprises: (a) contacting said mixture at a temperature of from 20° to 250° C. with a calcium-alumino silicate having a pore cross-sectional diameter of about 5 angstrom units wherein said silicate has the capacity to selectively sorb the linear ketone component of said mixture and to reject the non-linear ketone component, (b) withdrawing the unsorbed component of said mixture from said silicate, and (c) recovering the sorbed component from said silicate.

2. A process in accordance with claim 1 wherein said mixture comprises from 1 to 99% of said linear aliphatic ketone and from 99 to 1% of said non-linear ketone.

3. A process in accordance with claim 1 wherein said mixture contains an inert organic solvent.

4. A process in accordance with claim 1 wherein said temperature is in the range of from 50° to 180° C.

5. A process in accordance with claim 1 wherein said linear ketone is methyl ethyl ketone.

6. A process in accordance with claim 1 wherein said mixture comprises methyl ethyl ketone and cyclopentanone.

7. A process in accordance with claim 1 wherein said linear ketone is 2-octanone.

8. A process in accordance with claim 1 wherein said mixture comprises 2-octanone and cyclooctanone.

References Cited

UNITED STATES PATENTS 3,193,582   7/1965   Adams et al.

OTHER REFERENCES

Barrer, J. Soc. Chem. Ind., vol. 64, pp. 130–135.

BERNARD HELFIN, Primary Examiner

N. P. MORGENSTERN, Assistant Examiner

U.S. Cl. X.R.

210—24; 260—593